United States Patent
Kubo et al.

(10) Patent No.: US 11,869,488 B2
(45) Date of Patent: Jan. 9, 2024

(54) AGENT DEVICE, AGENT SYSTEM, AND COMPUTER-READABLE STORAGE MEDIUM

(71) Applicant: TOYOTA JIDOSHA KABUSHIKI KAISHA, Toyota (JP)

(72) Inventors: Chikage Kubo, Chofu (JP); Keiko Nakano, Kawasaki (JP); Eiichi Maeda, Itabashi-ku (JP); Hiroyuki Nishizawa, Itabashi-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 166 days.

(21) Appl. No.: 17/106,701

(22) Filed: Nov. 30, 2020

(65) Prior Publication Data

US 2021/0193129 A1   Jun. 24, 2021

(30) Foreign Application Priority Data

Dec. 18, 2019   (JP) ................................ 2019-228518

(51) Int. Cl.
| | |
|---|---|
| *G10L 15/18* | (2013.01) |
| *G10L 15/26* | (2006.01) |
| *G10L 15/22* | (2006.01) |

(52) U.S. Cl.
CPC .......... *G10L 15/1822* (2013.01); *G10L 15/26* (2013.01); *G10L 2015/223* (2013.01); *G10L 2015/225* (2013.01)

(58) Field of Classification Search
CPC ................. G10L 15/1822; G10L 15/26; G10L 2015/223; G10L 2015/225
See application file for complete search history.

(56) References Cited

U.S. PATENT DOCUMENTS

| | | | |
|---|---|---|---|
| 2002/0026320 A1 | 2/2002 | Kuromusha et al. | |
| 2004/0049499 A1* | 3/2004 | Nomoto | G06F 16/3329 |
| 2009/0318777 A1* | 12/2009 | Kameyama | G01C 21/3608 |
| | | | 704/251 |

(Continued)

FOREIGN PATENT DOCUMENTS

| | | |
|---|---|---|
| JP | 6-149812 A | 5/1994 |
| JP | 2001-141500 A | 5/2001 |

(Continued)

*Primary Examiner* — Bhavesh M Mehta
*Assistant Examiner* — Darioush Agahi
(74) *Attorney, Agent, or Firm* — Oblon, McClelland, Maier & Neustadt, L.L.P.

(57) ABSTRACT

In cases in which a confidence score of an inferred intent label is a predetermined threshold or less, an intent inference section searches for whether or not wording pertaining to a location, such as "on the door", is present in a question. In cases in which a word relating to a location is present, the intent inference section consults individual function identification data associated with OM item codes in order to find intent labels including individual functions relevant to the location (such as "door"). In cases in which an intent label including an individual function relevant to the "door" is found, an OMA interaction control section consults QA data to find and acquire associated response information based on the found intent label and the OM item code, and notifies a HMI interaction control section of such response information.

15 Claims, 7 Drawing Sheets

(56) References Cited

U.S. PATENT DOCUMENTS

| | | | |
|---|---|---|---|
| 2013/0246392 A1 | 9/2013 | Farmaner et al. | |
| 2013/0304730 A1 | 11/2013 | Zhou | |
| 2017/0358303 A1* | 12/2017 | Walker, II | G10L 15/22 |
| 2019/0103103 A1* | 4/2019 | Ni | G06F 3/167 |
| 2019/0266908 A1 | 8/2019 | Tsuchiya | |
| 2019/0286414 A1* | 9/2019 | Langos | G10L 15/22 |
| 2019/0392827 A1* | 12/2019 | Park | G10L 15/1815 |
| 2020/0097774 A1* | 3/2020 | Stucki | G06Q 10/20 |
| 2020/0257857 A1* | 8/2020 | Peper | G06N 7/005 |
| 2020/0279002 A1* | 9/2020 | Kim | G10L 15/18 |
| 2021/0166683 A1* | 6/2021 | Joh | G01G 19/52 |
| 2022/0115016 A1* | 4/2022 | Whalin | G10L 15/08 |

FOREIGN PATENT DOCUMENTS

| | | |
|---|---|---|
| JP | 2002-73322 A | 3/2002 |
| JP | 2006-004274 A | 1/2006 |
| JP | 2011-221591 A | 11/2011 |
| JP | 2015-511746 A | 4/2015 |
| JP | 2018-169494 A | 11/2018 |
| JP | 2019-145002 A | 8/2019 |

* cited by examiner

| Location | Individual function classification | Individual function name | Intent label |
|---|---|---|---|
| Door | Switch | Door locking switch | 44, 56, 88 |
| | | Power window switch | 44, 57, 88 |
| | Handle | Interior door handle | 11, 24, 36, 154 |
| | | Exterior door handle | 12, 24, 37, 155 |
| | ... | ... | ... |
| Meter | Lamp | Brake warning lamp | 88, 111, 155, 186 |
| | | Remaining fuel warning lamp | 89, 112, 158, 199 |
| | | ... | ... |
| ... | ... | ... | ... |

AGENT DEVICE, AGENT SYSTEM, AND COMPUTER-READABLE STORAGE MEDIUM

CROSS-REFERENCE TO RELATED APPLICATION

This application is based on and claims priority under 35 USC § 119 from Japanese Patent Application No. 2019-228518 filed on Dec. 18, 2019, the disclosure of which is incorporated by reference herein.

TECHNICAL FIELD

The present disclosure relates to an agent device, an agent system, and a computer-readable storage medium stored with an agent program that are configured to provide explanation regarding devices, operation, and so on.

RELATED ART

Japanese Patent Application Laid-Open (JP-A) No. 2001-141500 (Patent Document 1) discloses a vehicle agent processing device that provides information regarding the operation of various onboard devices.

Specifically, the vehicle agent processing device employs a syntax analysis section to interpret the meaning of a signal received by a wireless communication section, either after performing speech recognition when provided with audio information including a natural voice, or as-is in the case of an email. The vehicle agent processing device selects information regarding operation of various onboard devices inside a vehicle to be summarized with priority, and synthesizes this information into audio to be output through a speaker. When a requirement for operation of one of the various onboard devices is inferred, this is automatically determined by an agent processing section, and audio guidance appended with operation guidance information regarding this onboard device is given.

However, if a user is unable to word a question clearly, resulting in an ambiguous question, sometimes a suitable response cannot be formulated. For example, in the case of an ambiguous question such as "I want to know what that switch on the door is", it may not be possible to formulate a suitable response.

SUMMARY

In consideration of the above circumstances, an object of the present disclosure is to provide an agent device, an agent system, and a computer-readable storage medium stored with an agent program that are capable of increasing the probability of being able to formulate a suitable response, even in cases in which a user is unable to word a question clearly.

An agent device according to a first aspect includes a recognition section configured to recognize spoken content, and an output section configured to output response information for spoken content recognized by the recognition section. Moreover, in cases in which response information for the spoken content cannot be prepared and in which the recognition section has recognized in the spoken content a predetermined word used to identify an individual function pertaining to a vehicle, the output section outputs a relevant list that is relevant to the word as the response information.

According to the first aspect, the recognition section recognizes spoken content. The output section outputs response information for spoken content recognized by the recognition section, and, in cases in which response information for the spoken content cannot be prepared and in which the recognition section has recognized in the spoken content a predetermined word used to identify an individual function pertaining to a vehicle, the output section outputs a relevant list that is relevant to the word as the response information. Namely, even in cases in which a user is unable to word a question clearly, outputting the relevant list that is relevant to the predetermined word used to identify an individual function pertaining to the vehicle that was present in the spoken content enables the probability of being able to formulate a suitable response to be increased.

Note that as in a second aspect, configuration may be made such that in cases in which response information for the spoken content cannot be prepared and in which the recognition section has recognized in the spoken content the predetermined word and a word pertaining to a predetermined individual function, the output section outputs a relevant list that is relevant to both the predetermined word and the predetermined individual function as the response information. This increases the probability of being able to formulate a suitable response compared to a case in which a relevant list that is relevant to only the predetermined word is output as the response information.

Moreover, as in a third aspect, configuration may be made such that the predetermined word is at least one of a word expressing a location where the individual function is disposed, a word expressing a shape of the individual function, or a word expressing a color of the individual function. This enables a response to be obtained for an individual function of which the name is not known by posing a question including a word expressing at least one out of the location, the shape of the individual function, or the color of the individual function.

As in a fourth aspect, configuration may be made such that the output section is configured to output pre-prepared candidate images as the relevant list. This enables an object to be specified by looking at the candidate images when a question has been asked about an object of which the name is not known.

As in a fifth aspect, configuration may be made such that in cases in which there is no corresponding relevant list, the output section is configured to output an error message including content requesting an utterance including a word used to identify the individual function. This enables response candidates to a question to be found more easily.

As in a sixth aspect, configuration may be made such that the recognition section is configured to recognize spoken content regarding a manual of a vehicle. The recognition section recognizing specialized spoken content regarding a vehicle manual in this manner enables the precision with which utterances relating to a vehicle manual are recognized to be improved.

An agent system according to a seventh aspect includes a recognition section configured to recognize spoken content, and an output section configured to output response information for spoken content recognized by the recognition section, and, in cases in which response information for the spoken content cannot be prepared and in which the recognition section has recognized in the spoken content a predetermined word used to identify an individual function pertaining to a vehicle, the output section outputs a relevant list that is relevant to the word as the response information. The agent system further includes an information provision device that is installed in a vehicle and that includes functionality to detect an utterance of an occupant, provide the detected utterance to the recognition section, and report the response information output from the output section.

According to the seventh aspect, the recognition section recognizes spoken content. The output section outputs response information for the spoken content recognized by the recognition section, and, in cases in which response information for the spoken content cannot be prepared and in which the recognition section has recognized in the spoken content a predetermined word used to identify an individual function pertaining to a vehicle, the output section outputs a relevant list that is relevant to the word as the response information.

The information provision device is installed in a vehicle and detects an utterance of an occupant, provides detected spoken content to the recognition section, and reports the response information output from the output section. When a user makes an utterance so as to pose a question to the information provision device installed in the vehicle in order to obtain a response, even in cases in which the user is unable to word the question clearly, a relevant list that is relevant to the predetermined word present in the spoken content used to identify an individual function pertaining to the vehicle is output to the information provision device and reported thereby, enabling the probability of being able to formulate a suitable response to be increased.

Note that as in an eighth aspect, a computer-readable storage medium may be stored with an agent program for causing a computer to function as the respective sections of the agent device of any one of the first aspect to the sixth aspect.

As described above, the present disclosure provides an agent device, an agent system, and a computer-readable storage medium stored with an agent program that are capable of increasing the probability of being able to formulate a suitable response, even in cases in which a user is unable to word a question clearly.

BRIEF DESCRIPTION OF DRAWINGS

An exemplary embodiment of the present invention will be described in detail based on the following figures, wherein.

DETAILED DESCRIPTION

Figure 1:
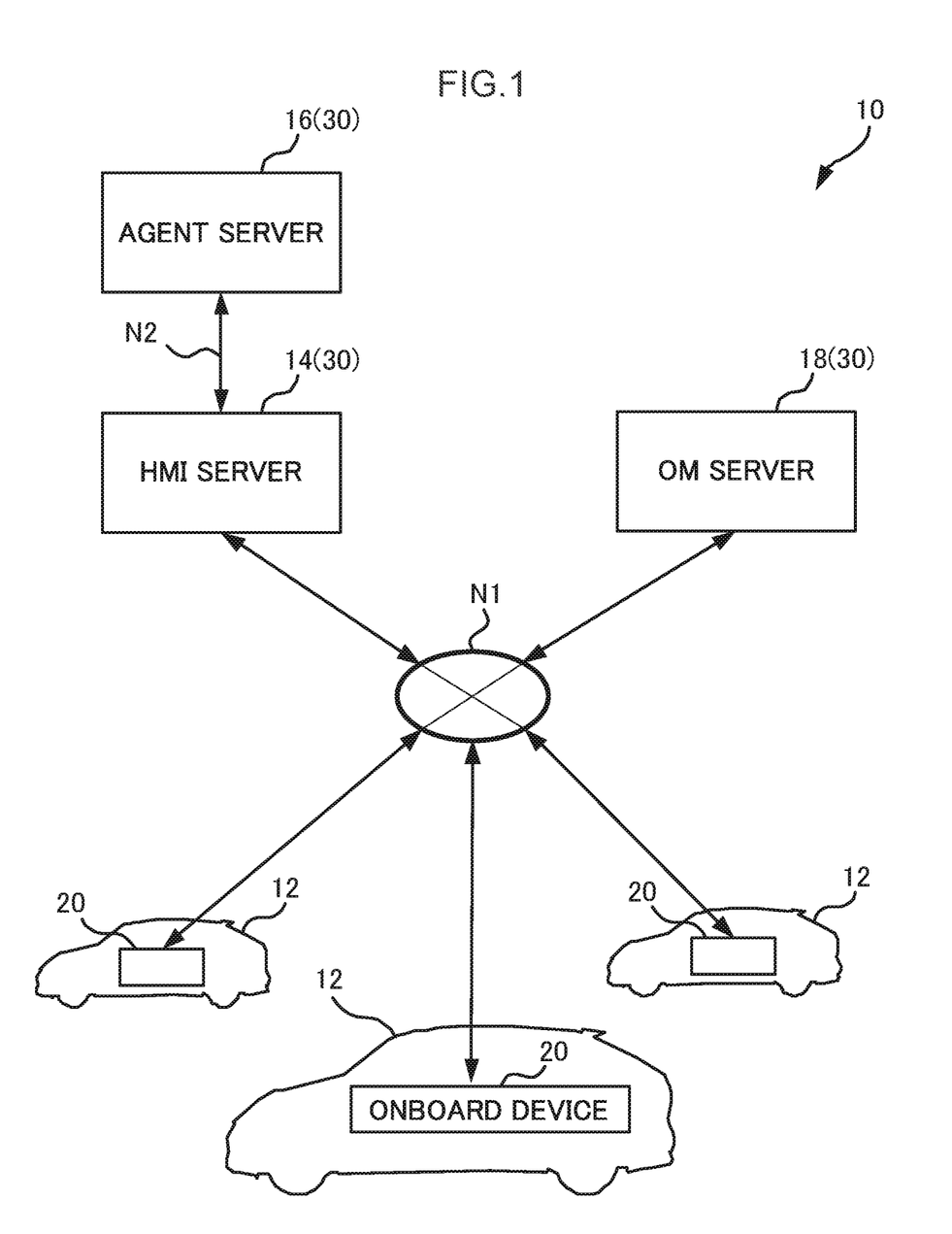
FIG. 1 is a diagram illustrating a schematic configuration of a manual provision system according to an exemplary embodiment.

Detailed explanation follows regarding an example of an exemplary embodiment of the present disclosure, with reference to the drawings. In the present exemplary embodiment, as an example of an agent system, explanation is given regarding a manual provision system that provides vehicle manuals. FIG. 1 is a diagram illustrating a schematic configuration of the manual provision system according to the present exemplary embodiment.

As illustrated in FIG. 1, a manual provision system 10 of the present exemplary embodiment is configured including plural vehicles 12 and plural servers 30. An onboard device 20, serving as an information provision device, is installed in each of the vehicles 12. The servers 30 include a human machine interface (hereafter referred to as HMI) server 14 that functions as a human machine interface, an agent server 16, and an owner's manual (hereafter also abbreviated to OM) server 18. Note that the agent server 16 corresponds to an agent device.

The onboard devices 20 of the respective vehicles 12, the HMI server 14, and the OM server 18 are connected to each other via a network N1. The HMI server 14 and the agent server 16 are connected to each other through a network N2.

Vehicle

Figure 2:
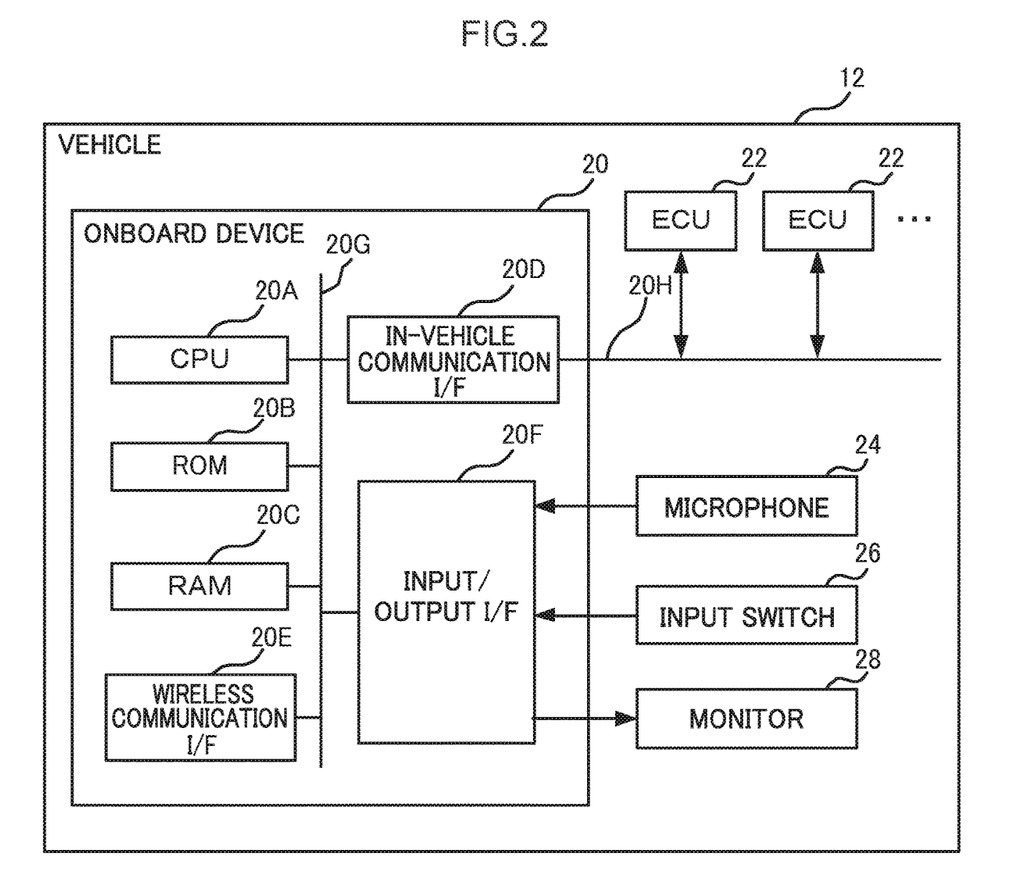
FIG. 2 is a block diagram illustrating a hardware configuration of a vehicle of an exemplary embodiment.

First, explanation follows regarding hardware configuration of the vehicles 12. FIG. 2 is a block diagram illustrating a hardware configuration of a vehicle of the present exemplary embodiment.

As illustrated in FIG. 2, the vehicle 12 according to the present exemplary embodiment is configured including the onboard device 20, plural ECUs 22, a microphone 24, an input switch 26, and a monitor 28.

The onboard device 20 is configured including a central processing unit (CPU) 20A, Read Only Memory (ROM) 20B, random access memory (RAM) 20C, an in-vehicle communication interface (I/F) 20D, a wireless communication I/F 20E, and an input/output I/F 20F. The CPU 20A, the ROM 20B, the RAM 20C, the in-vehicle communication I/F 20D, the wireless communication I/F 20E, and the input/output I/F 20F are connected together so as to be capable of communicating with each other via an internal bus 20G.

The CPU 20A is a central processing unit (central processing circuitry) that executes various programs and controls various sections. Namely, the CPU 20A reads a program from the ROM 20B and executes this program using the RAM 20C as a workspace.

The ROM 20B stores various programs and various data. A control program for controlling the onboard device 20 is stored in the ROM 20B of the present exemplary embodiment.

As described above, the RAM 20C acts as a workspace to temporarily store various programs and data while the CPU 20A is executing the programs.

The in-vehicle communication I/F 20D is an interface for connecting with the ECUs 22. CAN protocol communication standards are employed for this interface. The in-vehicle communication I/F 20D is connected to an external bus 20H. Plural of the ECUs 22 are provided corresponding to the respective functions of the vehicle 12. Examples of the ECUs 22 of the present exemplary embodiment include a vehicle control ECU, an engine ECU, a brake ECU, a body ECU, a camera ECU, and a multimedia ECU.

The wireless communication OF 20E is a wireless communication module for communicating with the servers 30. A communication standard such as 5G LTE, or Wi-Fi (registered trademark) is employed for this wireless communication module. The wireless communication OF 20E is connected to the network N1.

The input/output OF 20F is an interface for communicating with the microphone 24, the input switch 26, and the monitor 28 installed in the vehicle 12.

The microphone 24 is a device that is for example provided to a front pillar or a dashboard of the vehicle 12 in order to pick up sounds from an occupant.

The input switch 26 is a switch that is for example provided to a center console or a steering wheel and is input with operation by the fingers of an occupant. A push-button ten-key pad, a touch pad, or the like may be adopted as the input switch 26.

The monitor 28 is a liquid crystal monitor that is provided to the center console or to a meter panel in order to display an owner's manual or response information, described later. The monitor 28 may be provided in the form of a touch panel that also serves as the input switch 26.

Server

Figure 3:
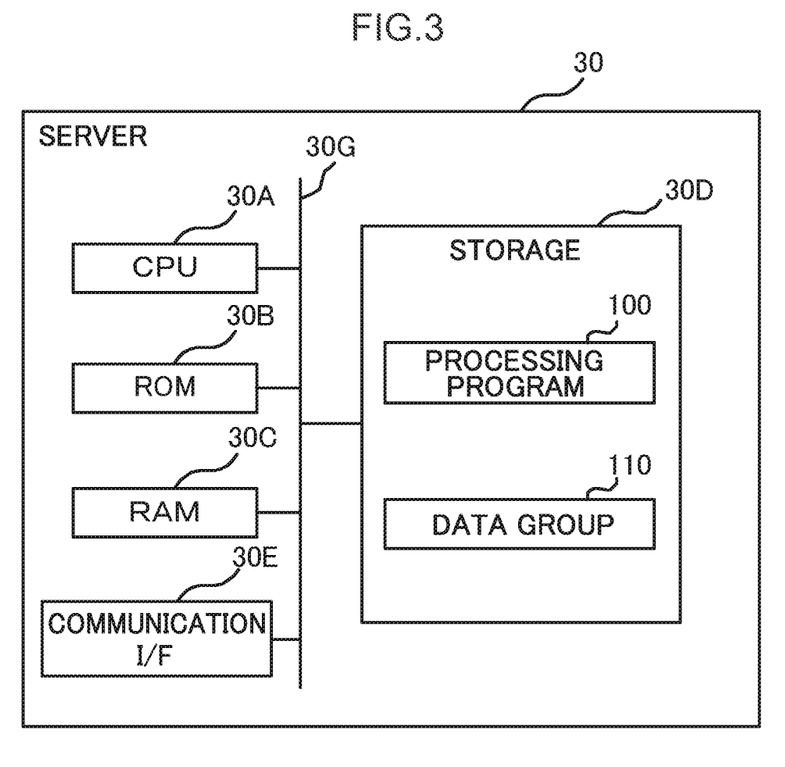
FIG. 3 is a block diagram illustrating a hardware configuration of a server of an exemplary embodiment.

Next, explanation follows regarding hardware configuration of the servers 30. FIG. 3 is a block diagram illustrating a hardware configuration of a server of the present exemplary embodiment.

As illustrated in FIG. 3, each of the servers 30 is configured including a CPU 30A, ROM 30B, RANI 30C, storage 30D, and a communication OF 30E. The CPU 30A, the ROM 30B, the RAM 30C, the storage 30D, and the communication OF 30E are connected together so as to be capable of communicating with each other through an internal bus 30G The CPU 30A, the ROM 30B, the RAM 30C, and the communication OF 30E have functionality equivalent to that of the CPU 20A, the ROM 20B, the RAM 20C, and the wireless communication OF 20E of the onboard device 20 previously described.

The storage 30D is configured by a hard disk drive (HDD) or a solid state drive (SSD), and stores various programs and various data.

The CPU 30A reads a program from the storage 30D and executes this program using the RANI 30C as a workspace.

A processing program 100 and a data group 110 are stored in the storage 30D of the present exemplary embodiment. The processing program 100 is a program for implementing the various functionality included in the server 30.

Figure 4:
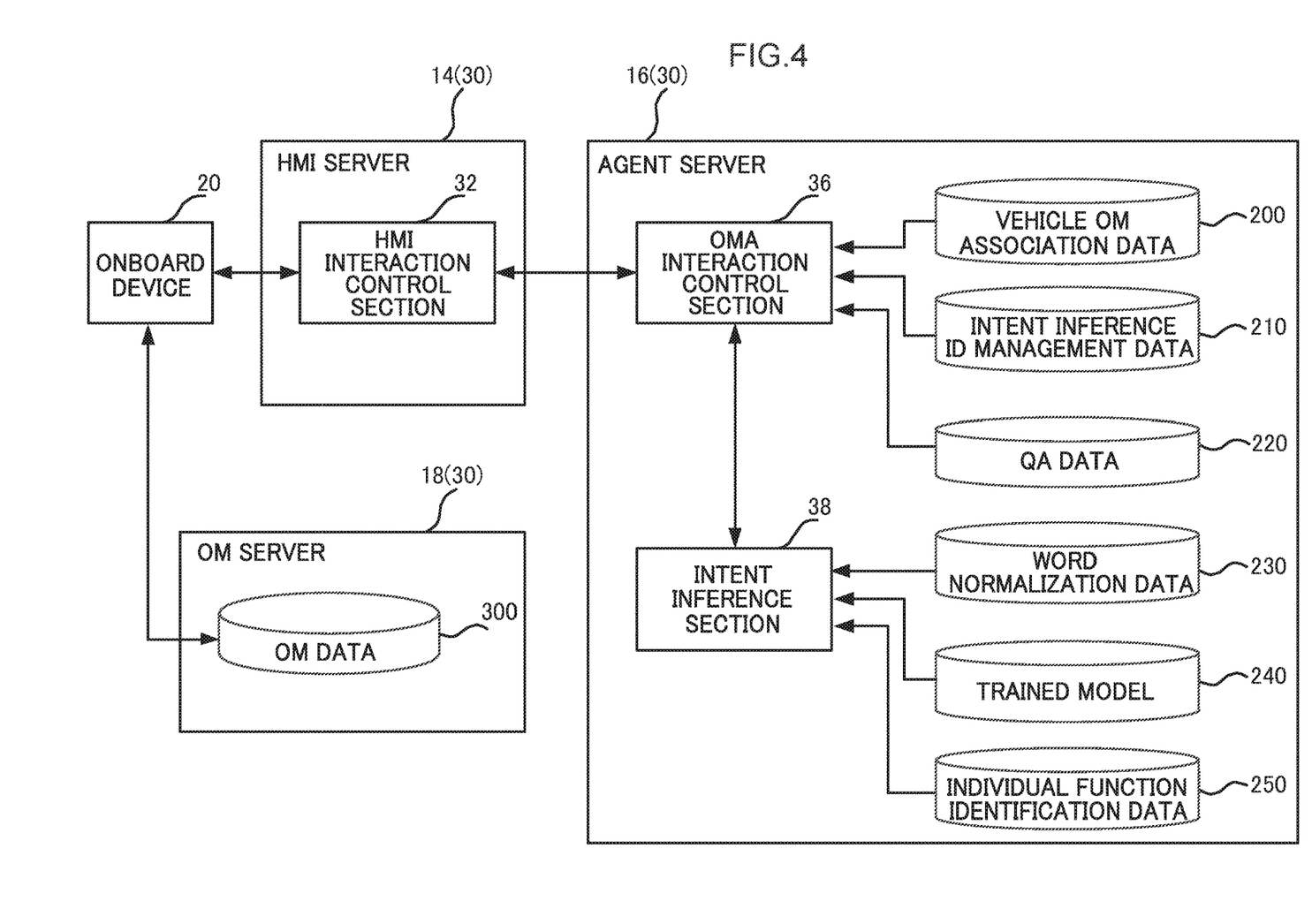
FIG. 4 is a functional block diagram to explain functionality of a manual provision system of an exemplary embodiment.

Next, explanation follows regarding functional configuration of the manual provision system 10 of the present exemplary embodiment. FIG. 4 is a functional block diagram to explain the functionality of the manual provision system of an exemplary embodiment.

HMI Server

The RMI server 14 includes functionality to receive a question from one of the onboard devices 20, and to refer to the agent server 16 for a response to a question relating to an owner's manual.

As illustrated in FIG. 4, in the HMI server 14 of the present exemplary embodiment, the CPU 30A functions as an HMT interaction control section 32 by executing the processing program 100.

The RMI interaction control section 32 communicates with the onboard devices 20. The HMI interaction control section 32 acquires audio information from an occupant of one of the vehicles 12 transmitted from the corresponding onboard device 20, and performs speech recognition to convert the audio information to text information. The HMI interaction control section 32 ascertains the intent of the words spoken by the occupant based on the converted text information. In cases in which the HMI interaction control section 32 ascertains that the occupant has asked a question relating to the owner's manual, the HMI interaction control section 32 refers to the agent server 16 regarding this question.

Agent Server

The agent server 16 functions as an agent (owner's manual agent (hereafter referred to as OMA)) that processes questions relating to owner's manuals. The agent server 16 acquires vehicle information for the corresponding vehicle 12 and text information relating to the question from the HMI server 14, and provides the HMI server 14 with response information relating to a response to the question.

In the agent server 16 of the present exemplary embodiment, the CPU 30A functions as an OMA interaction control section 36 and an intent inference section 38 by executing the processing program 100. Note that the OMA interaction control section 36 and the intent inference section 38 correspond to a recognition section and an output section.

The data group 110 of the agent server 16 includes vehicle OM association data 200, intent inference ID management data 210, QA data 220, word normalization data 230, a trained model 240, and individual function identification data 250.

The vehicle OM association data 200 is data in which vehicle information relating to the vehicle type, grade, equipment, and so on of each of the vehicles 12 is linked to OM item codes allocated in the respective owner's manuals.

The intent inference ID management data 210 is data to manage OM item codes and intent inference engine IDs associated with the OM item codes. The intent inference engine IDs are IDs allocated to each intent inference engine used to execute intent inference processing, described later. An intent inference engine is provided for each similar or relevant owner's manual.

The QA data 220 is data retaining response information linked to intent labels allocated to each response. Note that the intent labels are label numbers provided as a result of inferring intent from spoken content of an occupant. The response information relates to question responses, and includes displayable text, display images, text for text-to-speech readout, URLs to display owner's manuals, and so on.

The word normalization data 230 is data employed to normalize words, and is used in intent inference pre-processing. This pre-processing refers to processing to standardize differences in notation and expression. For example, the word normalization data 230 may include data for standardizing differences in notation, such as information indicating that "off" and "OFF" correspond to the same word. As another example, the word normalization data 230 may include data for standardizing different expressions, such as information indicating that "tire pressure warning lamp" and "air pressure warning lamp" refer to the same thing.

The trained model 240 is data generated by performing machine learning employing training data in which text information corresponding to plural ways of expressing a given question is the input, and an intent label relating to a response to this question is the output. The trained model 240 is prepared by advance training for each OMA intent inference engine. The trained model 240 is equipped with training data in which abbreviations, formal names, and similar expressions are linked to a single response.

The individual function identification data 250 is data in which each individual function pertaining to a vehicle (such as a switch or a lamp), predetermined words used to identify the individual functions, and relevant intent labels are associated with each other. The individual function identification data 250 is prepared in advance for each OM item code. As an example, the predetermined words to identify an individual function pertaining to the vehicle may include at least one out of a word expressing the location where the individual function is disposed, a word expressing the shape of the individual function, or a word expressing the color of the individual function. Other words may also be applied.

The OMA interaction control section 36 consults the vehicle OM association data 200 to find and acquire an OM item code associated with a given vehicle 12 based on the vehicle information for this vehicle 12. In cases in which an OM item code cannot be acquired, the OMA interaction control section 36 notifies the HMI interaction control section 32 that "this service is unavailable". The OMA interaction control section 36 also consults the intent inference ID management data 210 to find and acquire an OMA intent inference engine ID applicable to the given vehicle 12 based on the acquired OM item code.

The OMA interaction control section 36 also refers to the intent inference section 38, using text information and the OMA intent inference engine ID as input values, in order to acquire the intent label. In cases in which no corresponding intent label is found, the OMA interaction control section 36 notifies the HMI interaction control section 32 that "no results could be found". The OMA interaction control section 36 consults the QA data 220 to find and acquire associated response information based on the acquired intent label and OM item code.

The intent inference section 38 uses the intent inference engine with the corresponding intent inference engine ID to acquire the intent label, and supplies this to the OMA interaction control section 36. First, the intent inference section 38 performs pre-processing on text relating to the text information acquired via the OMA interaction control section 36. Differences in notation and expression are standardized during this pre-processing. The intent inference section 38 then uses the trained models 240 prepared for each OMA intent inference engine to perform intent inference processing on the pre-processed text information so as to output an intent label associated with the text information, and also computes a confidence score for this intent label. The OMA interaction control section 36 is notified of intent labels having a confidence score of a predetermined value or greater.

OM Server

The OM server 18 is a server that provides owner's manuals. The data group 110 of the OM server 18 includes OM data 300, this being HTML data relating to the respective the owner's manuals. The OM data 300 is read by specifying a URL or the like for display of the owner's manual included in the response information retained in the QA data 220.

However, in the manual provision system 10 according to the present exemplary embodiment, in cases in which the user has posed an ambiguous question, the intent inference section 38 is unable to find a corresponding intent label and notifies the HMI interaction control section 32 that "no results could be found". Therefore, a suitable response cannot be returned to the onboard device 20.

To address this, in the present exemplary embodiment, in cases in which spoken content uttered by a user cannot be recognized and in which a predetermined word used to identify an individual function is present within an ambiguous question, responses pertaining to an individual function relevant to this word are presented as a list, thereby increasing the probability of being able to formulate a response. In the following explanation, a location where an individual function is disposed is given as an example of a predetermined word used to identify the individual function.

Specifically, in cases in which the confidence score of an inferred intent label is a predetermined threshold or less, namely, in cases in which the result of inference is "no results could be found", the intent inference section 38 searches for whether or not a predetermined word used to identify an individual function is present in the question. For example, the intent inference section 38 searches for whether or not wording pertaining to a location, such as "on the door", is present in the question. In cases in which a word relating to a location is present, the individual function identification data 250 associated with the OM item codes is consulted in order to find intent labels including individual functions relevant to the location (such as "door"). In cases in which an intent label including an individual function relevant to the location is found, the OMA interaction control section 36 consults the QA data 220 to find and acquire associated response information based on the found intent label and the OM item code, and notifies the HMI interaction control section 32 of such response information. In this manner, a list of response information pertaining to the individual functions relevant to the location can thus be displayed on the corresponding onboard device 20 via the HMI interaction control section 32. The user selects response information corresponding to their intent from the list of response information, thereby increasing the probability of the user obtaining a response to their question. In other words, the user is able to obtain a response regarding an individual function such as a switch or a lamp whose name they do not know by posing a question including a predetermined word used to identify the individual function.

Figure 5:
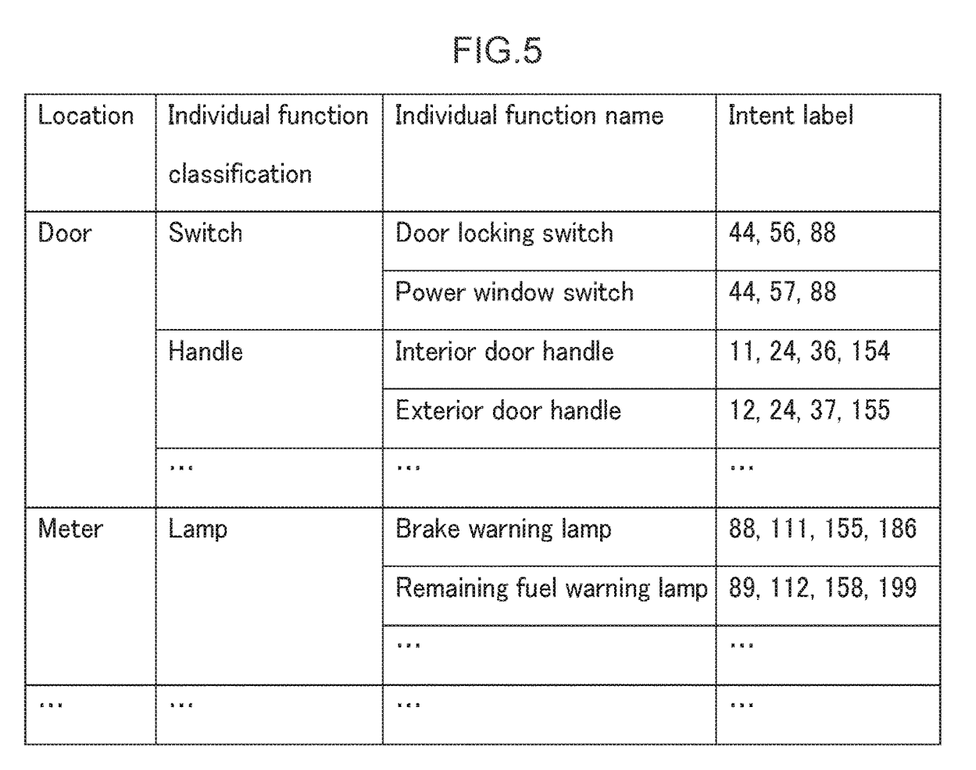
FIG. 5 is a table illustrating an example of individual function identification data in a case in which words expressing locations where individual functions are disposed are applied as words for identifying individual functions.

Explanation follows regarding an example of individual function identification data employed in the present exemplary embodiment. FIG. 5 is a diagram illustrating examples of individual function identification data 250 in a case in which words expressing locations where individual functions are disposed are applied as the predetermined words used to identify the individual functions pertaining to the vehicle.

As illustrated in FIG. 5, a location, an individual function classification, an individual function name, and intent labels are registered in association with each other in the individual function identification data 250. In the example in FIG. 5, "switch" and "handle" are registered as "individual function classifications" relevant to "door" as an example of a "location", and "door lock switch" and "power window switch" are registered under "switch". The associated intent label numbers are also registered. Namely, the individual function classifications and intent labels relevant to a given location can be obtained from the individual function identification data 250, thereby enabling the associated intent labels to be extracted and a list of response candidates to be provided in cases in which a word relevant to the "location" is present in the question. Note that the associated intent labels can be narrowed down further when providing response candidates in cases in which not only a "location" but also a word used to identify an individual function, such "switch" is present in the question.

Figure 6:
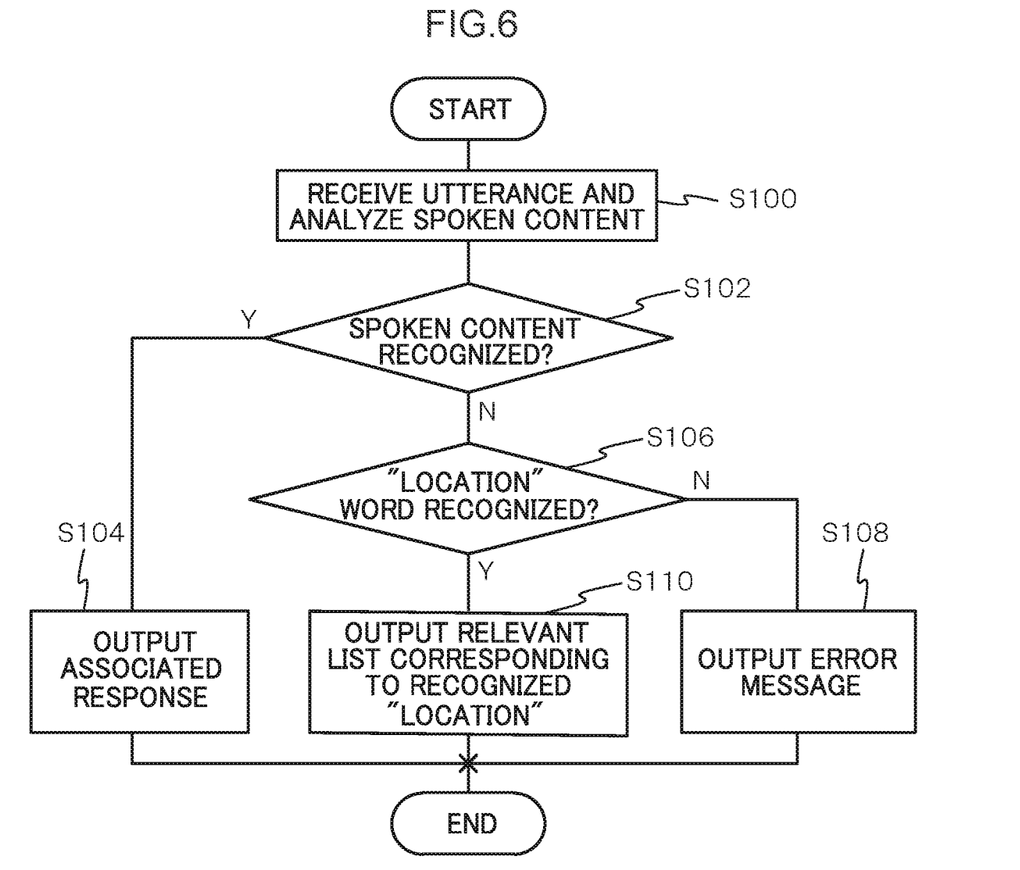
FIG. 6 is a flowchart illustrating an example of a flow of processing performed by an agent server of a manual provision system according to an exemplary embodiment.

Next, explanation follows regarding specific processing performed by the agent server 16 of the manual provision system 10 according to the present exemplary embodiment configured as described above. FIG. 6 is a flowchart illustrating an example of a flow of processing performed by the agent server 16 of the manual provision system 10 according to the present exemplary embodiment. Note that processing in FIG. 6 is initiated in cases in which the HMI interaction control section 32 refers to the agent server 16 regarding a question relating to the owner's manual posed by an occupant, and the OMA interaction control section 36 consults the vehicle OM association data 200 to find and acquire an OM item code associated with the vehicle 12 based on the vehicle information for the vehicle 12.

At step S100, the CPU 30A of the agent server 16 receives an utterance and analyzes the spoken content. Processing then transitions to step S102. Namely, the OMA interaction control section 36 consults the vehicle OM association data 200 to find and acquire an OM item code associated with the vehicle 12 based on the vehicle information for the vehicle 12. The OMA interaction control section 36 consults the intent inference ID management data 210 to find and acquire an OMA intent inference engine ID applicable to the vehicle 12 based on the acquired OM item code. The OMA interaction control section 36 then refers to the intent inference section 38 by inputting the text information, converted by speech recognition performed by the HMI interaction control section 32, and the OMA intent inference engine ID as input values, in order to analyze the spoken content. Note that the processing of step S100 corresponds to that of a recognition section.

At step S102, the CPU 30A of the agent server 16 determines whether or not the spoken content has been recognized. This determination is made by the OMA interaction control section 36 determining whether or not the confidence score of an intent label inferred by the intent inference section 38 exceeds the predetermined threshold. Processing transitions to step S104 in cases in which affirmative determination is made, and processing transitions to step S106 in cases in which negative determination is made.

At step S104, the CPU 30A of the agent server 16 outputs the associated response to the HMI server 14, and the processing routine is ended. Namely, the OMA interaction control section 36 consults the QA data 220 to find and acquire the associated response information based on the intent label acquired from the intent inference section 38 and the OM item code, and outputs this to the HMI server 14. A response to the question is thereby output from the HMI server 14 to the corresponding onboard device 20. Note that the response to the question is not limited to a single response, and for example plural responses may be provided to the onboard device 20 in cases in which plural intent labels with a confidence score exceeding the threshold are present.

At step S106, the CPU 30A of the agent server 16 determines whether or not a word pertaining to a "location" has been recognized. This determination is made by the intent inference section 38 consulting the individual function identification data 250 to determine whether or not a word pertaining to a "location" is present in the question. For example, determination is made as to whether or not a word that matches a "location" registered in the individual function identification data 250 is present in the question. Processing transitions to step S108 in cases in which a negative determination is made, and processing transitions to step S110 in cases in which an affirmative determination is made.

At step S108, the CPU 30A of the agent server 16 outputs an error message to the HMI server 14, and the processing routine is ended. The HMI server 14 accordingly sends an error notification to the onboard device 20 stating that "no results could be found" in response to the question. Note that content such as "Please ask another question specifying a location" may also be reported as the error message. This facilitates the search for response candidates to the question.

At step S110, the CPU 30A of the agent server 16 outputs a relevant list that is relevant to the recognized "location" to the HMI server 14, and the processing routine is ended. Namely, the intent inference section 38 acquires intent labels associated with the "location" registered in the individual function identification data 250. The OMA interaction control section 36 then consults the QA data 220 to find and acquire the associated response information based on the found intent labels and OM item codes, and notifies the HMI interaction control section 32 of this. Thus, a list of response information associated with the individual functions relevant to the "location" can be displayed on the onboard device 20 via the HMI interaction control section 32. The user selects the intended response information from the list of response information, thereby increasing the probability of obtaining a response to their question. Note that the processing of step S110 corresponds to that of an output section.

Figure 7:
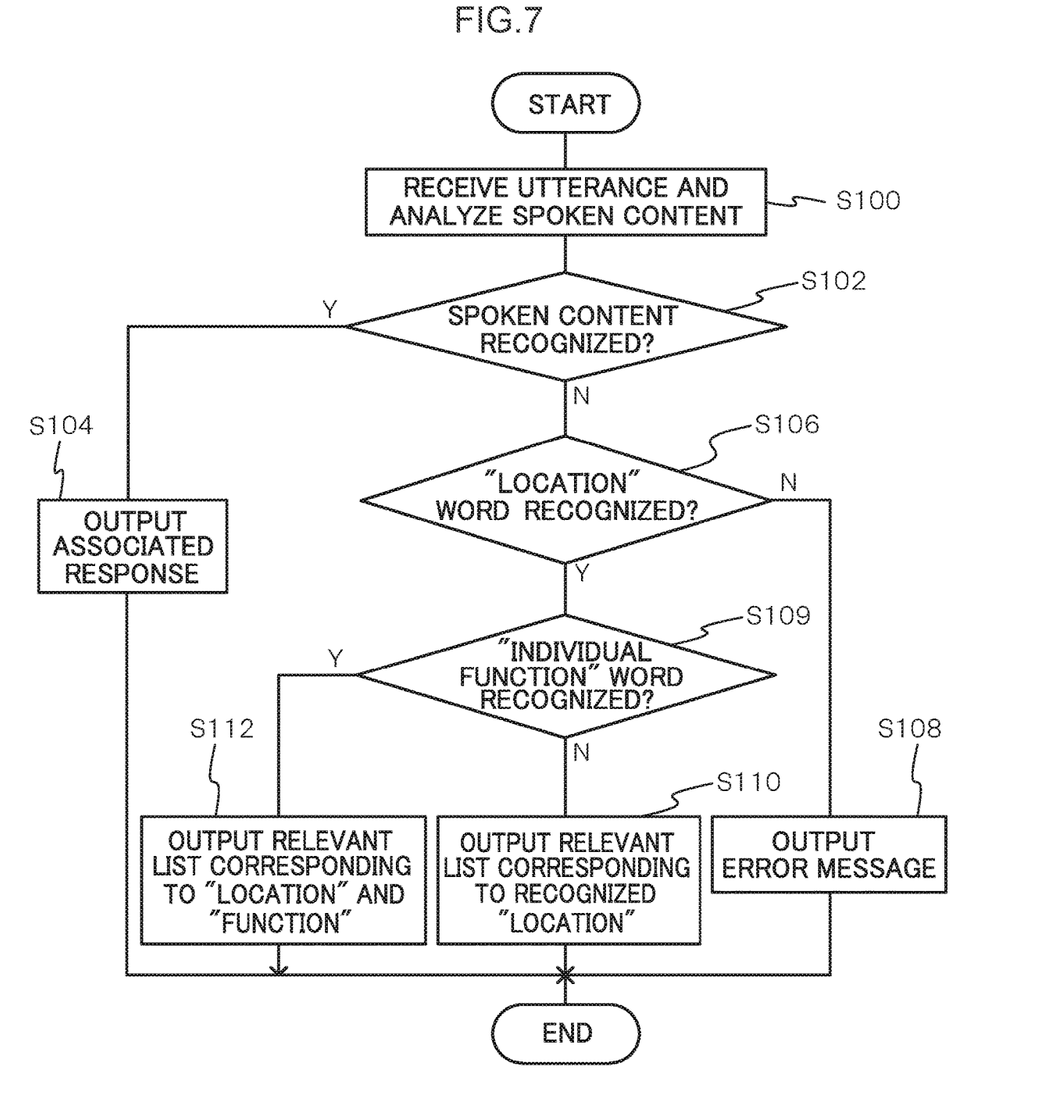
FIG. 7 is a flowchart illustrating a modified example of a flow of processing performed by an agent server of a manual provision system according to an exemplary embodiment.

Next, explanation follows regarding a case in which not only a "location", but also a word such as "switch" used to identify an "individual function" is present in the question, and the associated intent labels are narrowed down accordingly in order to provide response candidates. FIG. 7 is a flowchart illustrating a modified example of a flow of processing performed by the agent server 16 of the manual provision system 10 according to the present exemplary embodiment. Note that the processing in FIG. 7 is initiated in cases in which the HMI interaction control section 32 refers to the agent server 16 regarding a question relating to an owner's manual posed by an occupant, and the OMA interaction control section 36 consults the vehicle OM association data 200 to find and acquire an OM item code associated with the vehicle 12 based on the vehicle information for the vehicle 12. Processing similar to that in FIG. 6 is allocated the same reference numerals in the forthcoming explanation.

At step S100, the CPU 30A of the agent server 16 receives an utterance and analyzes the spoken content. Processing then transitions to step S102. Namely, the OMA interaction control section 36 consults the vehicle OM association data 200 to find and acquire an OM item code associated with the vehicle 12 based on the vehicle information for the vehicle 12. The OMA interaction control section 36 then consults the intent inference ID management data 210 to find and acquire an OMA intent inference engine ID applicable to the vehicle 12 based on the acquired OM item code. The OMA interaction control section 36 then refers to the intent inference section 38 by inputting the text information, converted by speech recognition performed by the HMI interaction control section 32, and the OMA intent inference engine ID as input values, in order to analyze the spoken content. Note that the processing of step S100 corresponds to that of a recognition section.

At step S102, the CPU 30A of the agent server 16 determines whether or not the spoken content has been recognized. This determination is made by the OMA interaction control section 36 determining whether or not the confidence score of an intent label inferred by the intent inference section 38 exceeds the predetermined threshold. Processing transitions to step S104 in cases in which affirmative determination is made, and processing transitions to step S106 in cases in which negative determination is made.

At step S104, the CPU 30A of the agent server 16 outputs the associated response to the HMI server 14, and the processing routine is ended. Namely, the OMA interaction control section 36 consults the QA data 220 to find and acquire the associated response information based on the intent label acquired from the intent inference section 38 and the OM item code, and outputs this to the HMI server 14. A response to the question is thereby output from the HMI server 14 to the corresponding onboard device 20. Note that the response to the question is not limited to a single response, and for example plural responses may be provided to the onboard device 20 in cases in which plural intent labels with a confidence score exceeding the threshold are present.

At step S106, the CPU 30A of the agent server 16 determines whether or not a word pertaining to a "location" has been recognized. This determination is made by the intent inference section 38 consulting the individual function identification data 250 to determine whether or not a word pertaining to a "location" is present in the question. For example, determination is made as to whether or not a word that matches a "location" registered in the individual function identification data 250 is present in the question. Processing transitions to step S108 in cases in which a negative determination is made, and processing transitions to step S109 in cases in which an affirmative determination is made.

At step S108, the CPU 30A of the agent server 16 outputs an error message to the HMI server 14, and the processing routine is ended. The HMI server 14 accordingly sends an error notification to the onboard device 20 stating that "no results could be found" in response to the question. Note that content requesting an utterance including a location, such as "Please ask another question specifying a location" may also be reported as the error message. This facilitates the search for response candidates to the question.

At step S109, the CPU 30A of the agent server 16 determines whether or not a word pertaining to an "individual function" has been recognized. This determination is made by the intent inference section 38 consulting the individual function identification data 250 to determine whether or not a word pertaining to an "individual function" is present in the question. For example, determination is made as to whether or not a word that matches an "individual function" registered in the individual function identification data 250 is present in the question. Processing transitions to step S110 in cases in which negative determination is made, and processing transitions to step S112 in cases in which affirmative determination is made.

At step S110, the CPU 30A of the agent server 16 outputs a relevant list that is relevant to the recognized "location" to the HMI server 14, and the processing routine is ended. Namely, the intent inference section 38 acquires intent labels associated with the "location" registered in the individual function identification data 250. The OMA interaction control section 36 then consults the QA data 220 to find and acquire the associated response information based on the found intent labels and the OM item codes, and notifies the HMI interaction control section 32 of this. Thus, a list of response information associated with the individual functions relevant to the "location" can be displayed on the onboard device 20 via the HMI interaction control section 32. The user selects the intended response information from the list of response information, thereby increasing the probability of obtaining a response to their question. Note that the processing of step S110 corresponds to that of an output section.

At step S112, the CPU 30A of the agent server 16 outputs a relevant list that is relevant to both the recognized "location" and "individual function" to the HMI server 14, and the processing routine is ended. Namely, the intent inference section 38 acquires intent labels associated with both the "location" and "individual function" registered in the individual function identification data 250. The OMA interaction control section 36 then consults the QA data 220 to find and acquire the associated response information based on the found intent labels and the OM item code, and notifies the HMI interaction control section 32 of this. Thus, a list of response information that is relevant to both the "location" and the "individual function" can be displayed on the corresponding onboard device 20 via the HMI interaction control section 32. The user selects the intended response information from the list of response information, thereby increasing the probability of obtaining a response to their question. Note that the processing of step S112 also corresponds to that of an output section.

Note that when outputting the relevant list at step S110 or S112 of the above exemplary embodiment, the HMI interaction control section 32 may be notified of display images included in the response information, and these display images may be displayed on the corresponding onboard device 20 as candidate images to prompt selection by the user. This enables the user to specify an object by viewing the candidate images in cases in which they are posing a question regarding an object whose name they are unaware of.

Although the HMI server 14, the agent server 16, and the OM server 18 configuring the manual provision system 10 are configured by separate servers 30 in the above exemplary embodiment, the functionality of each of the servers 30 may be consolidated into a single server 30. For example, all or some of the servers 30 corresponding to the HMI server 14, the agent server 16, and the OM server 18 may be consolidated. Moreover, the functionality of the OMA interaction control section 36 and the intent inference section 38 of the agent server 16 may be distributed between different servers 30.

Note that the various processing executed by the CPUs 20A, 30A reading and executing software (a program) in the above exemplary embodiment may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing executed by the agent server 16 as previously described may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the above exemplary embodiment, the program is in a format pre-stored (installed) in a computer-readable non-transitory recording medium. For example, the processing program 100 of each of the servers 30 is pre-stored in the storage 30D. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the program may be provided in a format downloadable from an external device through a network.

The processing flows explained in the above exemplary embodiment are merely examples, and superfluous steps may be omitted, new steps may be added, or the processing sequences may be changed within a range not departing from the spirit of the present disclosure.

What is claimed is:

1. An agent device comprising:
a processor configured to:
recognize spoken content as text data;
ascertain an intent of the spoken content using a trained model that is generated by performing machine learning employing training data in which text data is input, and an intent label associated with an intent expressed in the text data is output, the trained model being configured to output the intent label if the intent of the spoken content can be ascertained, and output that a corresponding intent label does not exist if the intent of the spoken content cannot be ascertained;
if the trained model outputs the intent outputting response information based on the intent label; and
if the trained model outputs that the corresponding intent label does not exist, and a predetermined word used to identify an individual function pertaining to a vehicle has been recognized in the spoken content, obtain a relevant list that is relevant to the recognized word based on association data that includes association between the individual function pertaining to the vehicle identified by the recognized word and at least one intent label, and output the obtained relevant list as the response information, so as to supplement the output of the trained model.

2. The agent device of claim 1, wherein:
in cases in which response information for the spoken content cannot be prepared and in which, in the spoken content, the predetermined word and a word pertaining to a predetermined individual function has been recognized, the processor outputs a relevant list that is relevant to both the predetermined word and the predetermined individual function as the response information.

3. The agent device of claim 2, wherein:
the predetermined word is at least one of a word expressing a location where the individual function is disposed, a word expressing a shape of the individual function, or a word expressing a color of the individual function.

4. The agent device of claim 2, wherein the processor is configured to output pre-prepared candidate images as the relevant list.

5. The agent device of claim 2, wherein:
in cases in which there is no corresponding relevant list, the processor is configured to output an error message including content requesting an utterance including a word used to identify the individual function.

6. The agent device of claim 2, wherein the processor is configured to recognize spoken content regarding a manual of a vehicle.

7. The agent device of claim 1, wherein:
the predetermined word is at least one of a word expressing a location where the individual function is disposed, a word expressing a shape of the individual function, or a word expressing a color of the individual function.

8. The agent device of claim 1, wherein the processor is configured to output pre-prepared candidate images as the relevant list.

9. The agent device of claim 1, wherein:
in cases in which there is no corresponding relevant list, the processor is configured to output an error message including content requesting an utterance including a word used to identify the individual function.

10. The agent device of claim 1, wherein the processor is configured to recognize spoken content regarding a manual of a vehicle.

11. The agent device of claim 7, wherein the processor is configured to output pre-prepared candidate images as the relevant list.

12. The agent device of claim 7, wherein:
in cases in which there is no corresponding relevant list, the processor is configured to output an error message including content requesting an utterance including a word used to identify the individual function.

13. The agent device of claim 7, wherein the processor is configured to recognize spoken content regarding a manual of a vehicle.

14. An agent system comprising:
an agent device including a first processor, the first processor being configured to:
recognize spoken content as text data;
ascertain an intent of the spoken content using a trained model that is generated by performing machine learning employing training data in which text data is input, and an intent label associated with an intent expressed in the text data is output, the trained model being configured to output the intent label if the intent of the spoken content can be ascertained, and output that a corresponding intent label does not exist if the intent of the spoken content cannot be ascertained;
if the trained model outputs the intent, output response information based on the intent label; and
if the trained model outputs that the corresponding intent label does not exist, and a predetermined word used to identify an individual function pertaining to a vehicle has been recognized in the spoken content, obtain a relevant list that is relevant to the recognized word based on association data that includes association between the individual function pertaining to the vehicle identified by the recognized word and at least one intent label, and output the obtained relevant list as the response information; and
an information provision device that is installed in a vehicle and that includes a second processor that is configured to detect an utterance of an occupant, provide the detected utterance to the agent device, and report the response information output from the agent device, so as to supplement the output of the trained model.

15. A non-transitory computer-readable storage medium stored with an agent program for causing a computer to:
recognize spoken content as text data;
ascertain an intent of the spoken content using a trained model that is generated by performing machine learning employing training data in which text data is input, and an intent label associated with an intent expressed in the text data is output, the trained model being configured to output the intent label if the intent of the spoken content can be ascertained, and output that a corresponding intent label does not exist if the intent of the spoken content cannot be ascertained;
if the trained model outputs the intent outputting response information based on the intent label; and
if the trained model outputs that the corresponding intent label does not exist, and a predetermined word used to identify an individual function pertaining to a vehicle has been recognized in the spoken content, obtain a relevant list that is relevant to the recognized word based on association data that includes association between the individual function pertaining to the vehicle identified by the recognized word and at least one intent label, and output the obtained relevant list as the response information, so as to supplement the output of the trained model.

* * * * *